(12) United States Patent
Inui et al.

(10) Patent No.: US 7,092,044 B2
(45) Date of Patent: Aug. 15, 2006

(54) DIGITAL BROADCASTING RECEIVER

(75) Inventors: Yasuhiro Inui, Yao (JP); Manabu Yamamoto, Mukou (JP); Kazuhiko Tani, Daito (JP); Yusuke Nishida, Ikoma (JP)

(73) Assignee: Funai Electric Co., Ltd., Daito (JP)

( * ) Notice: Subject to any disclaimer, the term of this patent is extended or adjusted under 35 U.S.C. 154(b) by 715 days.

(21) Appl. No.: 10/144,765

(22) Filed: May 15, 2002

(65) Prior Publication Data

US 2002/0186327 A1 Dec. 12, 2002

(30) Foreign Application Priority Data

May 15, 2001 (JP) .............................. 2001-145540

(51) Int. Cl.
*H04N 5/50* (2006.01)
(52) U.S. Cl. ...................... 348/732; 348/563; 348/569; 348/570; 348/731; 348/734; 725/38; 725/53; 725/56
(58) Field of Classification Search ................ 348/553, 348/563, 569–570, 725–731, 732–734; 725/38, 725/53, 56; H04N 5/50
See application file for complete search history.

(56) References Cited

U.S. PATENT DOCUMENTS

| | | | | |
|---|---|---|---|---|
| 5,371,550 A | * | 12/1994 | Shibutani et al. | ........... 348/570 |
| 5,786,869 A | * | 7/1998 | Baek et al. | .................. 348/565 |
| 6,731,345 B1 | * | 5/2004 | Lee | ............................. 348/553 |
| 6,765,628 B1 | * | 7/2004 | Van Houtum et al. | ...... 348/732 |
| 6,864,926 B1 | * | 3/2005 | Ohmatsu | ..................... 348/731 |
| 6,938,271 B1 | * | 8/2005 | Sakakibara | .................. 725/151 |
| 2003/0133050 A1 | * | 7/2003 | Shintani et al. | ............. 348/734 |
| 2003/0135856 A1 | * | 7/2003 | Hancock et al. | .............. 725/50 |
| 2003/0179320 A1 | * | 9/2003 | Kim | ............................. 348/732 |
| 2003/0213001 A1 | * | 11/2003 | Yuen et al. | .................. 725/136 |
| 2004/0268412 A1 | * | 12/2004 | Kim | ............................ 725/126 |

FOREIGN PATENT DOCUMENTS

JP 11-018018 1/1999
JP 2000-209072 7/2000

* cited by examiner

*Primary Examiner*—Brian P. Yenke
(74) *Attorney, Agent, or Firm*—Crowell & Moring LLP

(57) ABSTRACT

A digital broadcasting receiver that uses a channel map containing broadcast information such as channel numbers and virtual channel numbers is described. When a user selects a certain digital channel number, a control unit consisting of a CPU makes a search as to whether or not the number exists in the channel map. If the number does not exist, "No Signal" notice is displayed on a display and if the user selects a scan instruction then, the entire range of frequency band of the broadcasting signal is scanned. If a signal that corresponds to the digital channel number exists, its broadcast is received. Therefore, a search is possible even when the user knows only a virtual channel number and the digital channel number entered by the user is not registered in the channel map.

5 Claims, 4 Drawing Sheets

FIG. 4
CHANNEL MAP
| CH NUMBER | DIGITAL/ANALOG | VIRTUAL CH NO. | SUB CH |
|---|---|---|---|
| ⋮ | ⋮ | ⋮ | ⋮ |
| 9 | NON | – | – |
| 10 | NON | – | – |
| 11 | NON | – | – |
| 12 | NON | – | – |
| 13 | ANALOG | – | – |
| 14 | DIGITAL | 18 | 1, 5, 10, 15 |
FIG. 5
TELEVISION DISPLAY
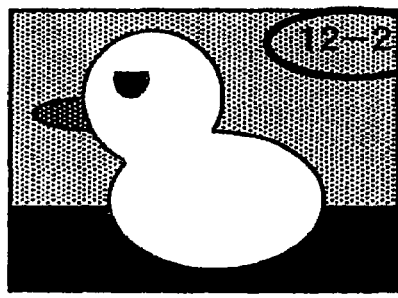
← DIGITAL CHANNEL NUMBER INPUT BY USER
FIG. 6
TELEVISION DISPLAY
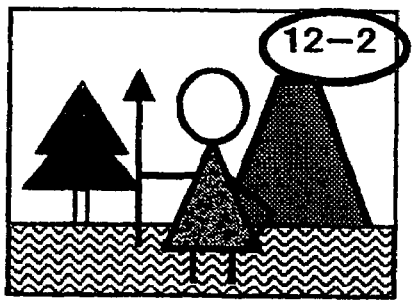
← VIRTUAL CHANNEL NUMBER 12 AND SUB CHANNEL NUMBER 2

DIGITAL BROADCASTING RECEIVER

BACKGROUND OF THE INVENTION

The present invention relates to a digital broadcasting receiver that uses broadcast channel map information containing channel numbers and virtual channel numbers.

Conventionally, there have been televisions equipped with broadcast channel memories, memories for identifying broadcast stations, etc., which read broadcasting station identification codes for the channels being received, and automatically rewrite desired channels to be received to new broadcast channels by going through search processes when the broadcast channels are changed (e.g., Japanese Unexamined Patent Publication No.11-18018).

Furthermore, in recent years, broadcasting stations in North America have been distributing digital broadcasts based on the ATSC (Advanced Television Systems Committee) Standards. As a result, certain types of broadcasting receivers (set top box; hereinafter called "STB") are becoming popular that receive these digital broadcasts and convert them into image signals that can be received by existing televisions. The STB typically is equipped with table data ("channel map"), which stores in an internal memory the data included in the broadcasting signal at the time when the broadcasting signal is received, and this channel map is used for the purpose of station selection later. It is possible to provide the STB with a capability of automatically rewriting the desired channel to be received to a new broadcast channel by going through the abovementioned search process.

However, the STB of the prior art could not select a station if the digital channel number inputted by a user was not registered in the channel map, so that it used to notify the user that there was no signal even though the broadcasting signal actually existed. More specifically, it was designed in such a way that a digital broadcasting signal could contain information data such as multiple channels (sub-channels) and virtual channel numbers in the same frequency band ("physical channel"), but it was not possible to select stations if the user knew only virtual channel numbers.

SUMMARY OF THE INVENTION

It is an object of the present invention to solve the abovementioned problems and to provide a digital broadcasting receiver that is capable of, even when the information concerning an arbitrary digital channel number inputted by the user has not been registered in the channel map and therefore the particular broadcast cannot be selected, scanning the broadcasting signal band and selecting the digital broadcasting signal that has the number as the virtual channel in compliance with the instruction by the user thereafter.

In the present invention, a digital broadcasting receiver comprises: an input unit for entering station selection and other instructions into the receiver; a receiving unit for receiving coded digital/analog broadcasting signals transmitted by a broadcasting station in accordance with the station selection instructions; a digital/analog decoding unit for decoding the digital/analog broadcasting signals received by the receiving unit, and outputting the decoded signals to a display device connected to the receiver for displaying images; a memory for storing broadcast information as a channel map to be used during station selection; and a control unit for controlling the units including the input and output units, and the memory, wherein the control unit executes: a process of searching a digital channel number in the channel map stored in the memory when the number is entered from the input unit, and as a result, receiving a broadcast corresponding to the number when the number is found, and notifying that no signal exists when the number is not found; and a process of scanning frequency band of the broadcasting signal by the receiving unit and the decoding unit when the number is not found as a result of the search and a scan instruction is entered by a user, and as a result, receiving a broadcast corresponding to the digital channel number when a signal for the number is found, and notifying that no such a signal exists when it is not found.

In this configuration, when the user enters the digital channel number, the control unit makes the search to see whether there is a corresponding number in the channel map stored in the memory, and receives the corresponding broadcast if the number exists, or notifies the user that no signal exists if the number does not exist. When the number does not exist in the channel map and the user enters the scan instruction, the control unit scans the broadcasting signal frequency band and, as a result, receives the broadcast if the signal of the digital channel number exists, or notifies the user that there is no signal if no signal exists. Thus, it is possible to search the digital channel number inputted arbitrarily by the user.

In the digital broadcasting receiver of the present invention, the control unit may further execute a process of switching the scanning function between enabling and disabling.

In this configuration, it is possible to avoid the scanning for selecting stations when the user does not intend to scan.

In the present invention, a digital broadcasting receiver comprises: an input unit for entering station selection and other instructions into the receiver; a receiving unit for receiving coded digital/analog broadcasting signals transmitted by a broadcasting station in accordance with the station selection instructions; a digital/analog decoding unit for decoding the digital/analog broadcasting signals received by the receiving unit, and outputting the decoded signals to a display device connected to the receiver for displaying images; a memory for storing broadcast information as a channel map including channel numbers and virtual channel numbers to be used during station selection; an OSD output unit for displaying specified on-screen display ("OSD") on the display device, and a control unit for controlling the units including the input and output units and the memory, wherein the control unit executes: a process of searching a digital channel number in the channel map stored in the memory when the number is entered from the input unit; a process of receiving a broadcast corresponding to the number when the number is found as a result of the search, and outputting a signal for OSD-displaying on the display device a notice that no signal exists when the number is not found; a process of scanning the entire range of frequency band of the broadcasting signal by the receiving unit and the decoding unit when the number is not found as a result of the search and a scan instruction is entered by a user; a process of receiving a broadcast corresponding to the digital channel number when a signal for the number is found as a result of the scan, and notifying that no such a signal exists when it is not found; and a process of switching the scanning function between enabling and disabling.

In this configuration, when the user enters a digital channel number (e.g., 12-2), the control unit searches if the number exists in the channel map stored in the memory, and receives the corresponding broadcast if the number exists, or OSD-displays on the display device no-signal message (e.g., "no signal") if the number does not exist. If the user enters the scan instruction when the number does not exist, the control unit scans the entire range of frequency band of the broadcasting signal, and receives the broadcast if the signal of the digital channel number exists, and notifies the user that no signal exists if no such signal exists. Thus, even when the user knows only the virtual channel number, it can be searched. Also, the abovementioned scanning function normally requires some time to scan multiple broadcasting channels from the start to the end, however, it is possible to avoid selecting stations when the user does not intend to select by switching between enabling and disabling of the scanning function.

BRIEF DESCRIPTION OF THE DRAWINGS

FIG. 4 is a diagram showing a channel map stored in the memory of the receiver.

FIG. 5 is a view of the television display when the receiver is receiving a digital channel input.

FIG. 6 is a view of the television display when the receiver is tuned to a virtual channel.

DETAILED DESCRIPTION OF THE PREFERRED EMBODIMENT OF THE PRESENT INVENTION

Figure 1:
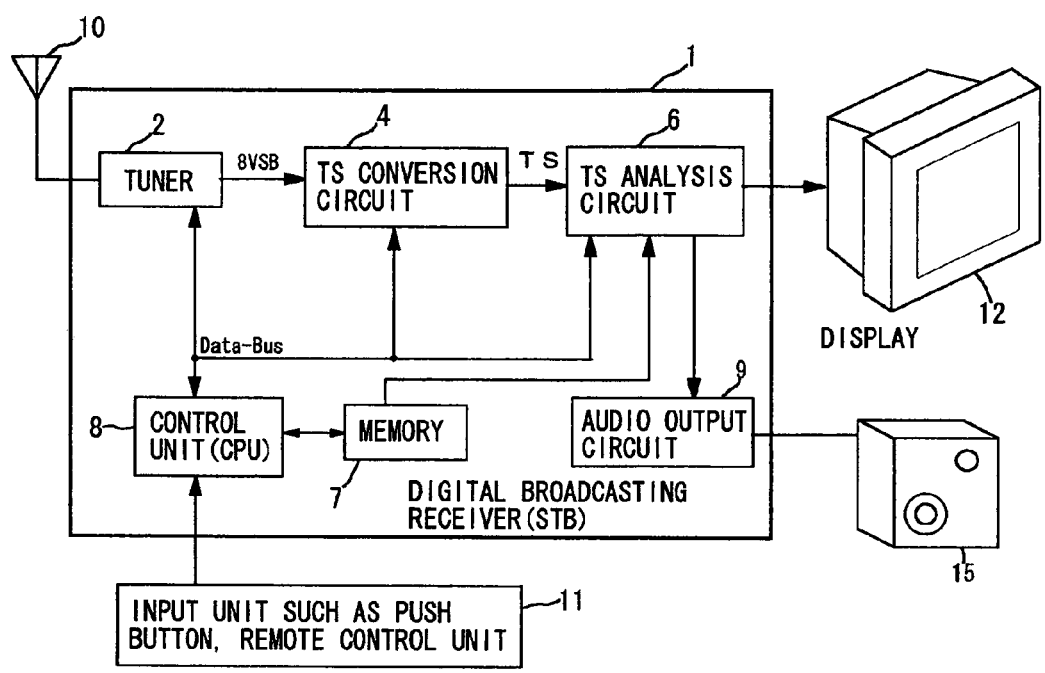
FIG. 1 is a block diagram of a digital broadcasting receiver according to an embodiment of the present invention.

A digital broadcasting receiver (set top box; "STB") according to an embodiment of the present invention will be described below referring to the accompanying drawings. FIG. 1 is a block diagram of an STB. A STB 1 is a device for receiving by an antenna 10 a digital broadcasting signal encoded according to ATSC and broadcasted from a television station in accordance with the user's operation input by using an input unit 11 such as push buttons or a remote control unit, and thus converting it to an image signal based on NTSC to be displayed on a display device 12.

The STB 1 comprises a tuner 2 (receiving unit) for receiving the digital broadcasting signals transmitted according to the modulation format of 8VSB (Vestigial Side Band), a TS conversion circuit 4 for converting the digital broadcasting signals received by the tuner 2 into transport streams (hereinafter called "TS"), a TS analysis circuit 6 for decoding image signals by analyzing the TS signals converted by the TS conversion circuit 4 and displaying images on the display device 12, a memory 7 for storing a channel map information of a transmission frequency, a channel number and a virtual channel number etc. of each main channel of the digital broadcast, an audio output circuit 9 for extracting the digital audio signal of a specific broadcasting language and causing a speaker 15 to generate audio outputs, and a control unit 8 consisting of a CPU for controlling each unit of the receiver. The channel map information is registered by scanning the entire range of frequency band of the broadcasting signal during the initialization of the receiver and is used for selecting stations later.

The tuner 2 receives digital broadcasting signals received by the antenna 10, selects a station in accordance with an instruction entered by the user into the control unit 8 using the input unit 11, and receives 8VSB-modulated digital broadcasting signals existing in the frequency range corresponding to the channel inputted by the user. The TS conversion circuit 4 converts the 8VSB-modulated broadcasting signals received by the tuner 2 into the TS signals.

Figure 2:
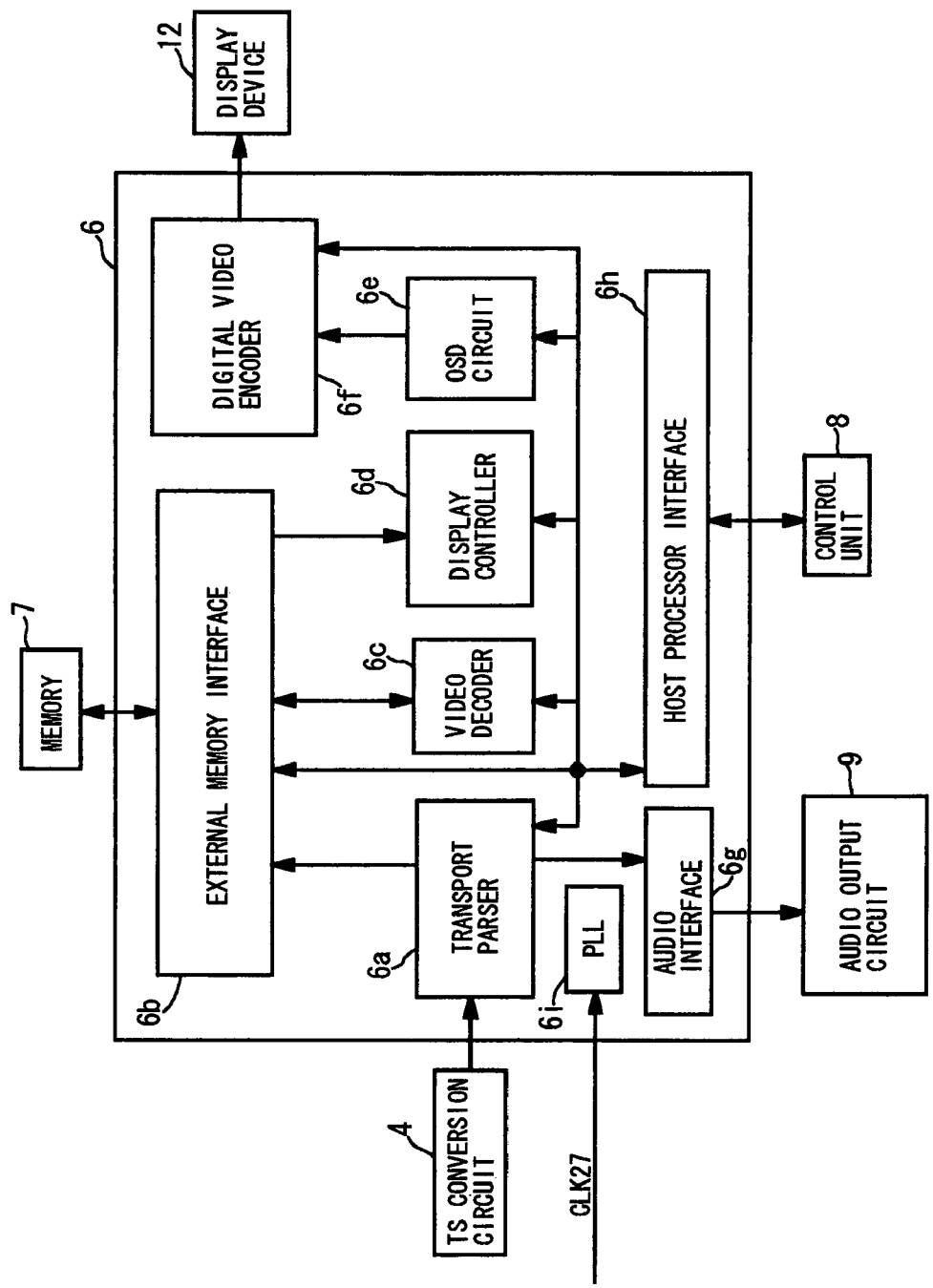
FIG. 2 is a block diagram of the TS (Transport Stream) analysis circuit of the receiver.

The TS analysis circuit 6 analyzes the TS signals converted by the TS conversion circuit 4, and outputs image signals added with OSD displays as needed to the display device 12. FIG. 2 is a block diagram of the TS analysis circuit 6. The TS analysis circuit 6 comprises a transport parser 6a (signal extraction unit), an external memory interface 6b, a video decoder 6c (digital decoding unit), a display controller 6d, an OSD circuit 6e (OSD output unit), a digital video encoder 6f, an audio interface 6g, a host processor interface 6h, and a PLL (Phase Locked Loop) circuit 6i. The transport parser 6a acquires TS signals transmitted from the TS conversion circuit 4, and parses them to image signals, audio signals and control signals. The external memory interface 6b receives instruction from the control unit 8 via the host processor interface 6h, and controls connections with the transport parser 6a, the video decoder 6c, and the display controller 6d as well as with the memory 7. For example, image signals, audio signals, and control signals parsed by the transport parser 6a are stored into the memory 7 via the external memory interface 6b respectively.

Upon receiving an instruction from the control unit 8, the video decoder 6c retrieves the image signals stored in the memory 7 to be decoded. Upon receiving an instruction from the control unit 8, the display controller 6d converts the image signals decoded by the video decoder 6c into the NTSC format. Upon receiving an instruction from the control unit 8, the OSD circuit 6e sends out the image signals converted into the NTSC format by the video decoder 6c to the digital video encoder 6f, and also sends out image signals attached with an OSD display as needed to the digital video encoder 6f. Upon receiving an instruction from the control unit 8, the OSD circuit 6e executes an arithmetic processing to add an OSD display for each frame of an image signal in order to make OSD display in specified colors on the display device 12. The OSD circuit 6e also has a built-in memory for executing the abovementioned arithmetic processing.

Upon receiving an instruction from the control unit 8, the digital video encoder 6f converts image signals received from the OSD circuit 6e into analog signals to be outputted to the display device 12. The audio interface 6g sends out audio signals parsed by the transport parser 6a to the audio output circuit 9. The host processor interface 6h transmits instructions from the control unit 8 to the transport parser 6a, the external memory interface 6b, the video decoder 6c, the display controller 6d, the OSD circuit 6e, and the digital video encoder 6f. The PLL circuit 6i causes a local oscillation frequency to match with a specified frequency based on an inputted clock signal.

The memory 7 stores channel information concerning transmission frequency, etc., of each channel, and menu items, etc., concerning the receiver setup. The memory 7 also stores control signals parsed by the transport parser 6a. The control unit 8 controls each unit through a data-bus upon receiving the user's instructions entered by means of the input unit 11. For example, the control unit 8 analyzes a VCT (Virtual Channel Table) by retrieving the control signals which have been parsed by the transport parser 6a and stored in the memory 7, acquires the channel information of the channel currently being received based on status signals included therein, and outputs this channel information on the display device 12 via the OSD circuit 6e and the digital video encoder 6f.

The audio output circuit 9 converts audio signals acquired from the audio interface 6g to audio signals for the speaker 15, to output the audio signals to the speaker 15. More specifically, it extracts audio signals according to an instruction by the control unit 8, and decodes them to convert into analog signals. The input unit 11 is a device used for inputting the user's instructions such as channel switching to the control unit 8. Examples of the input unit 11 include push buttons provided on the front of the STB 1 and a remote control unit used for giving operation instructions for the STB 1 by means of infrared rays. The display device 12 can be a display of a television, a CRT, a flat panel display device such as an LCD (Liquid Crystal Display) and a PDP (Plasma Display Panel). If the display device 12 is capable of accepting digital signal input, the system can be configured by directly connecting the OSD circuit 6e with the input terminal of the display device 12 without going through the digital video encoder 6f. The speaker 15 is connected to the audio output circuit 9, and generates audio output based on audio signals processed by the audio output circuit 9.

The control unit 8 in this embodiment executes: a process of searching whether or not a digital channel number exists in the channel map stored in the memory 7 when the digital channel number is entered by the user via the input unit 11; a process of receiving the corresponding broadcast if the number is found as a result of the search, or outputting a signal for OSD-displaying the no-signal message if the number is not found; a process of scanning the entire range of frequency band of the broadcasting signal when a scan instruction is entered by the user via the input unit 11 as the number is not found as a result of the search; a process of receiving the corresponding broadcast if the signal of the digital channel number is found as a result of the scan, or outputting a signal for OSD-displaying the no-signal message if the signal is not found; and a process of switching between enabling and disabling the scanning function according to the user's instruction input.

Figure 3:
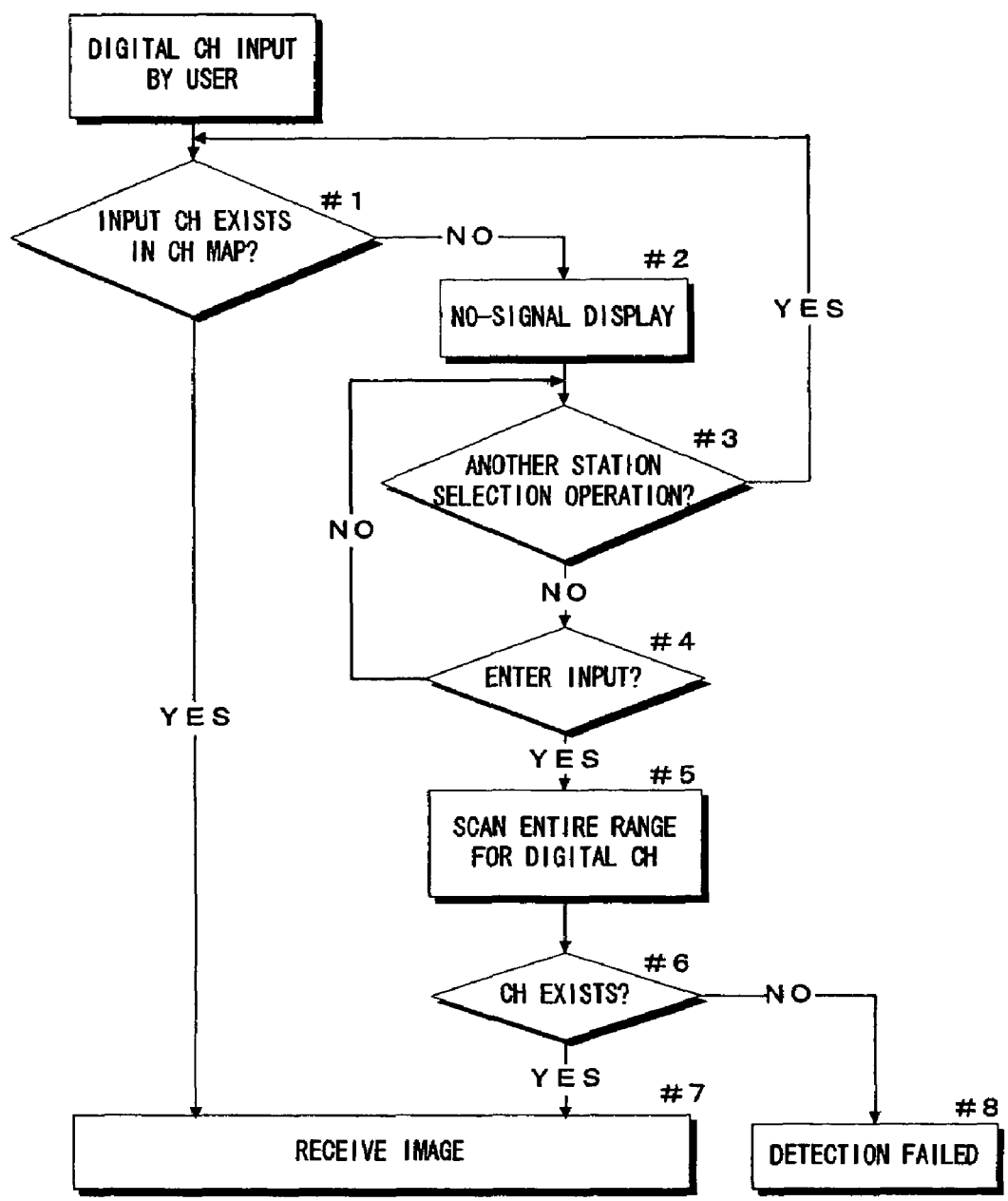
FIG. 3 is a flowchart of the operation process by the control unit of the receiver.

FIG. 3 is the operation process of the control unit 8 when receiving a digital channel input by the user. When the user enters a digital channel number (e.g., 12-2) via the input unit 11, the control unit 8 searches whether or not the number exists in the channel map of the memory 7 (#1), and receives the broadcast if the number exists (#1: Yes), or OSD-displays on the display device 12 no-signal message (e.g., "no signal") if the number does not exist (#1: No, #2). If the user enters another operation instruction for station selection when no corresponding number exists (#3: Yes), the control unit 8 returns to #1. If the user does not enter another operation instruction for station selection (#3: No) and enters a scan instruction (Enter key, Search key, etc., on the input unit 11) as an additional input (#4: Yes), the control unit 8 scans the entire range of frequency band of the broadcasting signal (#5), and if the signal for the digital channel number exists as a result (#6: Yes), the control unit 8 receives the broadcast (#7), or, if the signal does not exist (#6: No), OSD-displays the result (detection failure) (#8).

Thus, even in a case when the user knows only the virtual channel number and no-signal results because the virtual channel number information is not registered in the channel map, the virtual channel can be searched by means of additional input of a scan instruction. Also, since enabling/disabling of the scanning function can be switched, it is possible to avoid the scanning for selecting stations when the user does not want to scan by disabling the function.

Next, a specific case is described referring to FIG. 4 through FIG. 6. FIG. 4 is an example of a channel map stored in the memory 7. It is assumed that a physical channel (CH NUMBER) 10 ch is a digital channel having a virtual channel (VIRTUAL CH NO.) 12 ch, and sub channels (SUB CH) 1, 2 and 3, and no broadcasting signal exists on the physical channel 12 ch. It is also assumed that these are not registered in the channel map. The second column (DIGITAL/ANALOG) in FIG. 4 shows the kind or status of the physical channel in the channel map.

When the user selects "12-2" (digital channel number), the number is displayed on the television display as shown in FIG. 5, while no broadcasting signal exists on the physical channel 12 ch. Moreover, since the digital broadcasting signal with the virtual channel number of "12" is not registered in the channel map, "No Signal" is displayed on the display. When the user operates the Enter key (scan instruction) of the input unit 11 as an additional input, the entire range scanning for frequency band of the broadcasting signal is executed to search the digital broadcasting signal whose virtual channel number is "12". As the digital broadcast 10 ch, whose virtual channel number is "12", is detected as a result of the entire range scanning, it is received as shown in FIG. 6. Since it is not registered in the channel map at that time, the user performs the registration operation as needed.

Moreover, the user can perform by using the control unit 8 overall scanning to get a list of all digital channel numbers currently available. That is, upon receiving an instruction from the user through the input unit 11, the control unit 8 scans the entire range of frequency band of the broadcasting signal by its scanning function to prepare a list of digital channels of which the signals exist, notifies its results, and registers it in the channel map. This operation is useful for the user to look over available channels.

The present invention can be modified in various ways without being limited to the abovementioned embodiment. For example, the STB 1 can be configured in such a way that it can receive NTSC analog broadcasting signals in addition to ATSC digital broadcasting signals. In this case, the tuner 2 is also capable of receiving broadcasting signals in the band where analog broadcasts are distributed, and the STB 1 is separately equipped with an analog decoder for decoding the analog broadcasting signals received by the tuner 2.

What is claimed is:

1. A digital broadcasting receiver comprising: an input unit for entering station selection and other instructions into the receiver; a receiving unit for receiving coded digital/analog broadcasting signals transmitted by a broadcasting station in accordance with the station selection instructions; a digital/analog decoding unit for decoding the digital/analog broadcasting signals received by the receiving unit, and outputting the decoded signals to a display device connected to the receiver for displaying images; a memory for storing broadcast information as a channel map to be used during station selection; and a control unit for controlling the units including the input and output units, and the memory, wherein the control unit executes:
a process of searching a digital channel number in the channel map stored in the memory in response to the number being entered from the input unit, and as a result, receiving a broadcast corresponding to the number when the number is found, and notifying that no signal exists when the number is not found; and
a process of scanning frequency band of the broadcasting signal by the receiving unit and the decoding unit when the number is not found as a result of the search and in response to a scan instruction is entered by a user, and as a result, receiving a broadcast corresponding to the digital channel number when a signal for the number is found, and notifying that no such a signal exists when it is not found, wherein the control unit scans the entire range of frequency band of the broadcasting signal by its scanning function to prepare a list of digital channel numbers of which the signals are found, notifies its result, and executes a process of registering it in the channel map.

2. The digital broadcasting receiver as set forth in claim 1, wherein the control unit further executes a process of switching the scanning function between enabling and disabling.

3. A digital broadcasting receiver comprising: an input unit for entering station selection and other instructions into the receiver; a receiving unit for receiving coded digital/analog broadcasting signals transmitted by a broadcasting station in accordance with the station selection instructions; a digital/analog decoding unit for decoding the digital/analog broadcasting signals received by the receiving unit, and outputting the decoded signals to a display device connected to the receiver for displaying images; a memory for storing broadcast information as a channel map including channel numbers and virtual channel numbers to be used during station selection; an OSD output unit for displaying specified on-screen display ("OSD") on the display device, and a control unit for controlling the units including the input and output units and the memory, wherein the control unit executes:
a process of searching a digital channel number in the channel map stored in the memory in response to the number being entered from the input unit;
a process of receiving a broadcast corresponding to the number when the number is found as a result of the search, and outputting a signal for OSD-displaying on the display device a notice that no signal exists when the number is not found;
a process of scanning the entire range of frequency band of the broadcasting signal by the receiving unit and the decoding unit when the number is not found as a result of the search and in response to a scan instruction is entered by a user;
a process of receiving a broadcast corresponding to the digital channel number when a signal for the number is found as a result of the scan, and notifying that no such a signal exists when it is not found; and
a process of switching the scanning function between enabling and disabling, wherein the control unit scans the entire range of frequency band of the broadcasting signal by its scanning function to prepare a list of digital channel numbers of which the signals are found, notifies its result, and executes a process of registering it in the channel map.

4. A method for receiving broadcasting signals, comprising the acts of:
receiving a digital channel number;
searching for the digital channel number in a channel map stored in a memory in response to receipt of the digital channel number;
outputting a signal identifying that no signal exists when the digital channel number is not found in the channel map;
receiving a scan instruction from a user;
scanning when the digital channel number is not found in the channel map and in response to the received scan instruction, an entire range of frequency band of a broadcasting signal; and
receiving a broadcast corresponding to the digital channel number when a signal for the digital channel number is found as a result of the scan.

5. The method of claim 4, further comprising the act of:
updating the channel map using information obtained during the act of scanning.

* * * * *